United States Patent
Cheng

(10) Patent No.: US 10,914,982 B2
(45) Date of Patent: Feb. 9, 2021

(54) BACKLIGHT MODULE AND DISPLAY DEVICE

(71) Applicant: Wuhan China Star Optoelectronics Technology Co., Ltd., Wuhan (CN)

(72) Inventor: Yan Cheng, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 9 days.

(21) Appl. No.: 16/464,299

(22) PCT Filed: Dec. 4, 2018

(86) PCT No.: PCT/CN2018/119244
§ 371 (c)(1),
(2) Date: May 28, 2019

(87) PCT Pub. No.: WO2020/087651
PCT Pub. Date: May 7, 2020

(65) Prior Publication Data
US 2020/0301202 A1 Sep. 24, 2020

(30) Foreign Application Priority Data
Oct. 30, 2018 (CN) .......................... 2018 1 1279837

(51) Int. Cl.
*G09F 13/04* (2006.01)
*G02F 1/13357* (2006.01)

(52) U.S. Cl.
CPC .. *G02F 1/133603* (2013.01); *G02F 1/133606* (2013.01); *G02F 2001/133613* (2013.01)

(58) Field of Classification Search
CPC ......... G02F 1/133603; G02F 1/133606; G02F 2001/133613
USPC ...................................................... 362/97.1
See application file for complete search history.

(56) References Cited

U.S. PATENT DOCUMENTS

| | | | |
|---|---|---|---|
| 10,274,168 B2* | 4/2019 | Tamura ............. | G02F 1/133608 |
| 10,670,233 B2* | 6/2020 | Tamura ............. | H01L 25/0753 |
| 2008/0284942 A1* | 11/2008 | Mahama ........... | G02F 1/133611 |
| | | | 349/64 |
| 2011/0050558 A1* | 3/2011 | Park .................... | G02B 6/0068 |
| | | | 345/102 |
| 2011/0280002 A1* | 11/2011 | Furukawa ......... | G02F 1/133611 |
| | | | 362/97.1 |
| 2012/0268688 A1* | 10/2012 | Sato .................. | G02F 1/133603 |
| | | | 349/62 |

(Continued)

*Primary Examiner* — Ali Alavi

(57) ABSTRACT

A backlight module and a display device are provided. The backlight module includes a light source panel, a first optical control layer, and a second optical control layer. The light source panel includes a plurality of light-emitting blocks arranged in an array, and each of the light-emitting blocks is provided with a plurality of backlights arranged in an array and connected in parallel. The first optical control layer is spaced apart from the light source panel and includes a plurality of control regions each corresponds to one of the backlights. Each of the control regions has a light transmittance increasing from a center position to an edge position. The second optical control layer surrounds each of the light-emitting blocks and is configured to collect light emitted by each of the light-emitting blocks, such that the light emitted by each of the light-emitting blocks is emitted to a corresponding control region.

18 Claims, 4 Drawing Sheets

(56) References Cited

U.S. PATENT DOCUMENTS

2018/0023784 A1* 1/2018 Tamura .................... F21V 9/08
362/235

* cited by examiner

BACKLIGHT MODULE AND DISPLAY DEVICE

RELATED APPLICATIONS

This application is a National Phase of PCT Patent Application No. PCT/CN2018/119244 having International filing date of Dec. 4, 2018, which claims the benefit of priority of Chinese Patent Application No. 201811279837.9 filed on Oct. 30, 2018. The contents of the above applications are all incorporated by reference as if fully set forth herein in their entirety.

FIELD AND BACKGROUND OF THE INVENTION

The present disclosure relates to the field of display technologies, and more particularly to backlight module and a display device.

With development of display technologies, flat display devices such as liquid crystal displays (LCDs) are widely used in various consumer electronic products such as mobile phones, televisions, personal digital assistants, digital cameras, notebook computers, and desktop computers due to their high image quality, power saving, thin body, and wide application range. The liquid crystal display devices have become a mainstream in display devices.

Most of the liquid crystal display devices on the market are backlight type liquid crystal display devices, which include a liquid crystal panel and a backlight module. The working principle of the liquid crystal panel is to place liquid crystal molecules in two parallel glass substrates. There are many vertical and horizontal small wires between the two glass substrates. The liquid crystal molecules are controlled to change direction by energization or not, and light of the backlight module is refracted to generate an image.

Because the liquid crystal panel itself does not emit light, a light source provided by the backlight module needs to be used to display an image normally. Therefore, the backlight module becomes one of the key components of the liquid crystal display device. The backlight module is divided into a side type backlight module and a direct type backlight module according to different incident positions of the light source. The direct type backlight module is configured such that a backlight such as a cathode fluorescent lamp (CCFL) or a light emitting diode (LED) light source is disposed behind the liquid crystal panel, and light is homogenized by a diffusion plate to form a surface light source for the liquid crystal panel.

The direct type backlight module has advantages of high cost-performance ratio and good optical stability. Current direct type backlight module generally includes a back frame, a backlight disposed in the back frame, an optical film spaced apart from the backlight, and a diffusion plate disposed under the optical film. With continuous development of display technologies and a mainstream of a full-screen market, the direct type backlight module plays an important role in the realization of full screens. The backlight of the current direct type backlight module includes a plurality of light emitting diodes (LEDs) arranged in an array, brightness of a center and a periphery of each LED is not same, which causes issues of hotspot to be more serious, affecting a display performance.

SUMMARY OF THE INVENTION

The present disclosure provides a backlight module capable of improving a uniformity of light distribution and reduce a thickness of the backlight module.

The present disclosure provides a display device capable of improving a uniformity of light distribution and improving a display performance.

To achieve the above object, the present disclosure provides a backlight module including a light source panel, a first optical control layer, and a second optical control layer. The light source panel includes a plurality of light-emitting blocks arranged in an array, and each of the light-emitting blocks is provided with a plurality of backlights arranged in an array and connected in parallel. The first optical control layer is spaced apart from the light source panel. The first optical control layer includes a plurality of control regions, each of the control regions corresponds to one of the backlights, and each of the control regions has a light transmittance increasing from a center position of each of the control regions to an edge position of each of the control regions. The second optical control layer surrounds each of the light-emitting blocks and is configured to collect light emitted by each of the light-emitting blocks, such that the light emitted by each of the light-emitting blocks is emitted to a corresponding control region to avoid crosstalk of the light from different light-emitting blocks.

In an embodiment of the present disclosure, the first optical control layer is a haze film, and each of the control regions is provided with a plurality of light-transmitting holes spaced apart from each other, in a same control region, a density of the light-transmitting holes gradually increases from the center position of each of the control regions to the edge position of each of the control regions.

In an embodiment of the present disclosure, each of the light-transmitting holes has a circular shape.

In an embodiment of the present disclosure, the first optical control layer has a haze greater than 90%.

In an embodiment of the present disclosure, the second optical control layer is one or a combination of a grating layer and a light angle modulator.

In an embodiment of the present disclosure, the backlight is a light emitting diode (LED) lamp.

In an embodiment of the present disclosure, the backlight module further includes a diffusion film disposed on a side of the first optical control layer away from the light source panel.

In an embodiment of the present disclosure, each of the light-emitting blocks includes sixteen backlights arranged in four rows and four columns.

In an embodiment of the present disclosure, the center position of each of the control regions is directly above a corresponding backlight.

The present disclosure further provides a display device including the above backlight module.

The beneficial effects of the embodiment of the present disclosure are that, the embodiment of the present disclosure provides a backlight module including a light source panel, a first optical control layer, and a second optical control layer. The light source panel includes a plurality of light-emitting blocks arranged in an array, and each of the light-emitting blocks is provided with a plurality of backlights arranged in an array and connected in parallel. The first optical control layer is spaced apart from the light source panel. The first optical control layer includes a plurality of control regions, each of the control regions corresponds to one of the backlights, and each of the control regions has a light transmittance increasing from a center position of each of the control regions to an edge position of each of the control regions. The second optical control layer surrounds each of the light-emitting blocks and is configured to collect light emitted by each of the light-emitting blocks, such that the light emitted by each of the light-emitting blocks is emitted to a corresponding control region. Each of the control regions is controlled, such that the light emitted by the backlight module is evenly distributed, a light emitting performance of the backlight module is improved, and a structure thereof is simple, which is beneficial to thinning of the backlight module. The embodiment of the present disclosure also provides a display device capable of improving a uniformity of light distribution and improving a display performance.

BRIEF DESCRIPTION OF THE SEVERAL VIEWS OF THE DRAWINGS

In order to further understand features and technical contents of the present disclosure, referring to the following detailed description and drawings related to the present disclosure. The drawings are provided for the purpose of illustration and description only, and are not intended to limit the disclosure.

DESCRIPTION OF SPECIFIC EMBODIMENTS OF THE INVENTION

In order to further clarify technical means and effects of the present disclosure, the following detailed description will be made in conjunction with the preferred embodiments of the present disclosure and the accompanying drawings.

Figure 1:
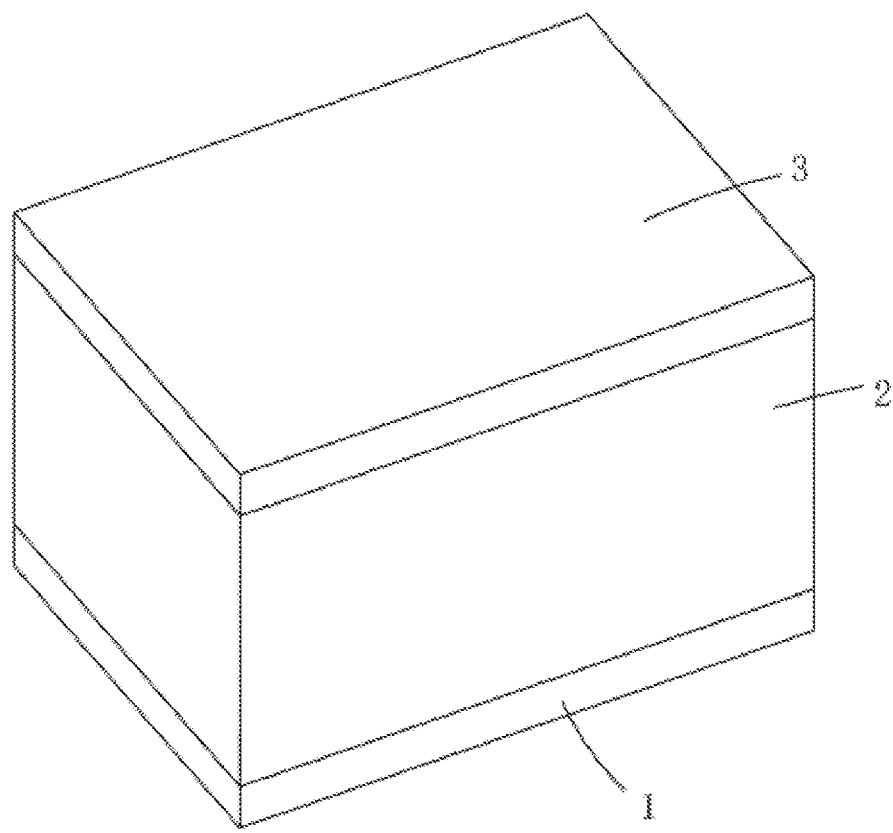
FIG. 1 is a perspective view of a backlight module according to an embodiment of the present disclosure.
Figure 2:
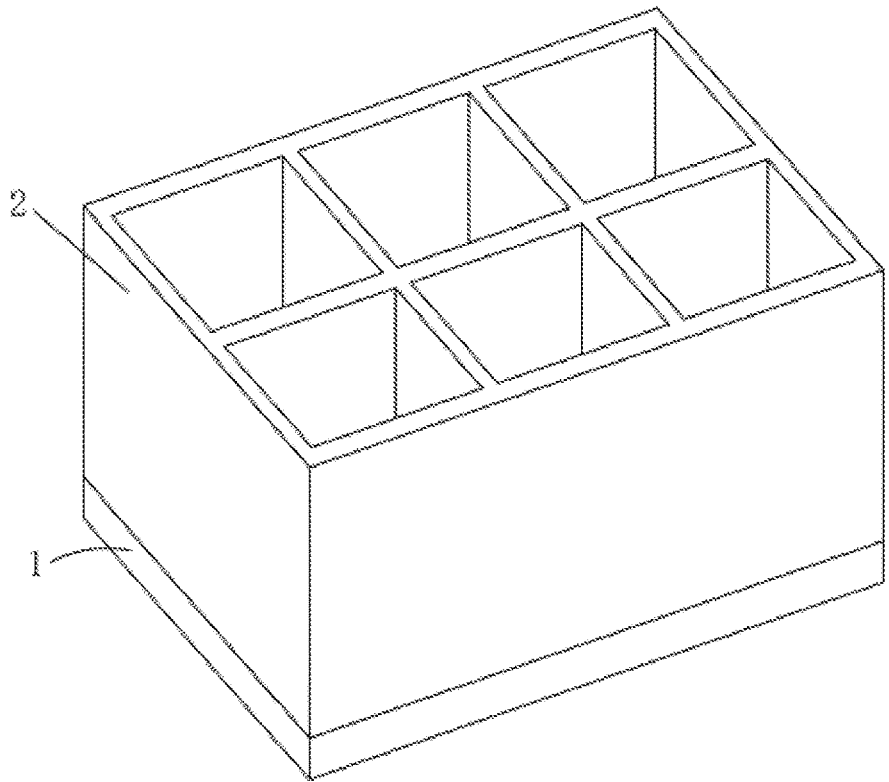
FIG. 2 is a perspective view of a light source panel and a second optical control layer of a backlight module according to an embodiment of the present disclosure.
Figure 3:
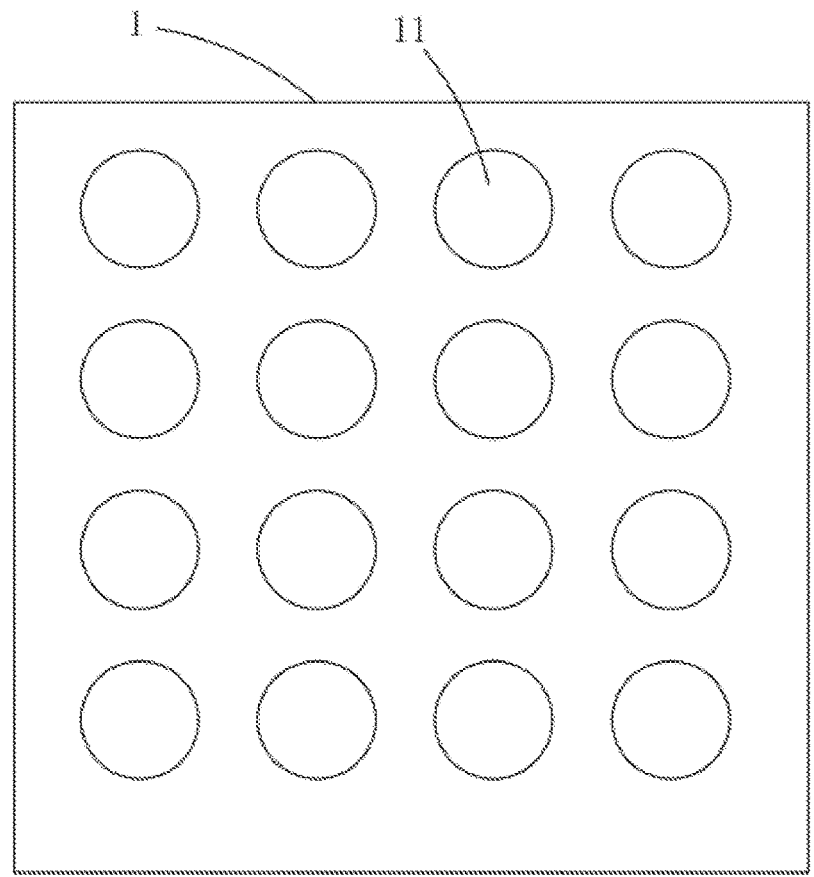
FIG. 3 is a schematic view of a light source panel of a backlight module according to an embodiment of the present disclosure.

Referring to FIGS. 1 to 3, an embodiment of the present disclosure provides a backlight module including a light source panel 1, a first optical control layer 2, and a second optical control layer 3. The light source panel 1 includes a plurality of light-emitting blocks 11 arranged in an array, and each of the light-emitting blocks 11 is provided with a plurality of backlights 12 arranged in an array and connected in parallel. The first optical control layer 2 is spaced apart from the light source panel 1. The first optical control layer 2 includes a plurality of control regions 21, each of the control regions 21 corresponds to one of the backlights 12, and each of the control regions 21 has a light transmittance increasing from a center position of each of the control regions 21 to an edge position of each of the control regions 21. The second optical control layer 3 surrounds each of the light-emitting blocks 11 and is configured to collect light emitted by each of the light-emitting blocks 11, such that the light emitted by each of the light-emitting blocks 11 is emitted to a corresponding control region 21 to avoid crosstalk of the light from different light-emitting blocks 11.

In details, the center position of each of the control regions 21 is directly above a corresponding backlight 12.

In details, when the backlight module is in operation, the light emitted by each of the backlights 12 has the strongest intensity at a center position thereof and gradually decreases from the center position to an edge position thereof, and the light of the center position of each of the backlights 12 corresponds to a center position of the corresponding control region 21, and the light of the edge position thereof corresponds to an edge position of the corresponding control region 21. Because the transmittance of each of the control regions 21 increases from the central position thereof to the edge position thereof, such that light emitted by the backlight 12 is redistributed by a corresponding control region 21, and the light emitted by each of the backlights 12 is evenly emitted from the corresponding control region 21.

Figure 5:
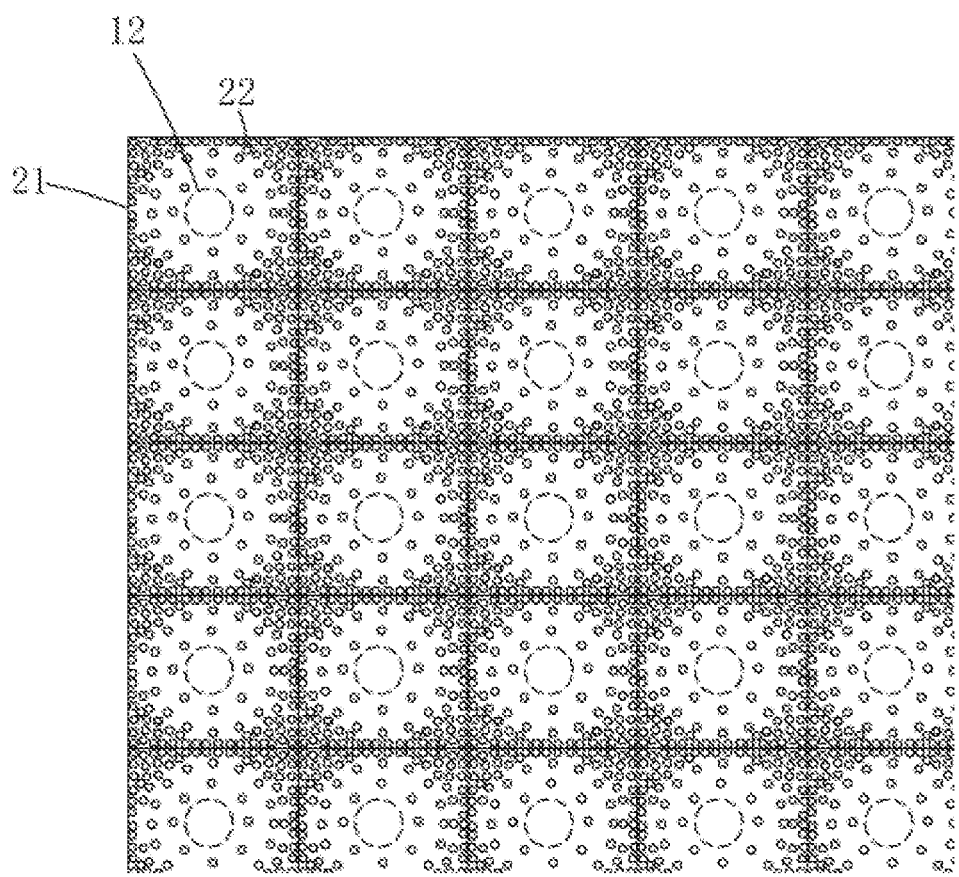
FIG. 5 is a top plan view of a first optical control layer of a backlight module according to an embodiment of the present disclosure.
Figure 6:
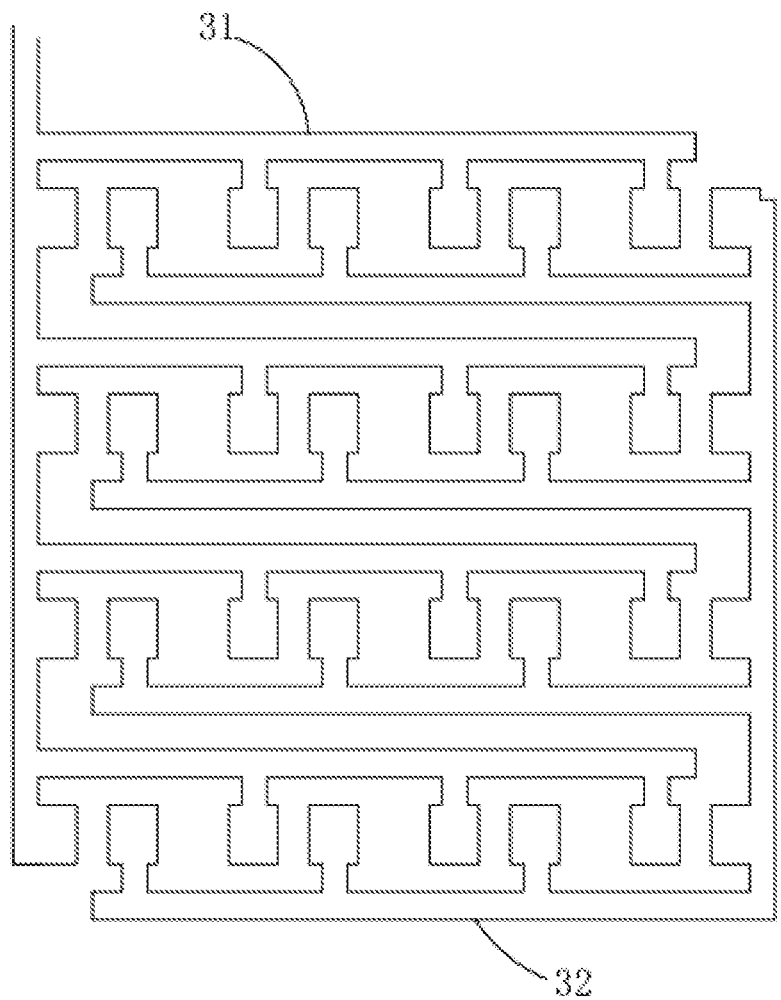
FIG. 6 is a schematic view of a soldering trace of the light-emitting block illustrated in FIG. 4.

In details, referring to FIG. 5, the first optical control layer 2 is a haze film, and each of the control regions 21 is provided with a plurality of light-transmitting holes 22 spaced apart from each other, in a same control region 21, a density of the light-transmitting holes 22 gradually increases from the center position of each of the control regions 21 to the edge position of each of the control regions 21.

In details, the first optical control layer 2 has a reflection effect toward one side of the light source. When the light generated by the backlight 12 reaches a portion of the first optical control layer 2 where the light-transmitting holes 22 are not provided, the light can be reflected (at least being partially reflected) back to the light source panel 1, and then the light is emitted at other positions of the light source panel 1, such that the light generated by the backlight 12 can be distributed and transmitted through different positions of the light-transmitting holes 22.

Preferably, the central position of the control region 21 has no light-transmitting holes 22.

Preferably, each of the light-transmitting holes 22 has a circular shape.

Preferably, the first optical control layer 2 has a haze greater than 90%.

In details, the second optical control layer 2 is one or a combination of a grating layer and a light angle modulator.

Preferably, the second optical control layer 2 is a combination of a grating layer and a light angle modulator, and the light angle modulator modulates light incident on the second optical control layer 2 by the light-emitting blocks 11 to a predetermined angle, the grating layer parallelizes an exit direction of the light incident on the second optical control layer 2, and finally the light emitted by each of the light-emitting blocks 11 is collected, such that the light emitted by each of the light-emitting blocks 11 is emitted to a corresponding control region 21, thereby avoiding a mutual crosstalk between the light-emitting blocks 11.

In details, the backlight module further includes a diffusion film 4 disposed on a side of the first optical control layer 2 away from the light source panel 1.

Figure 4:
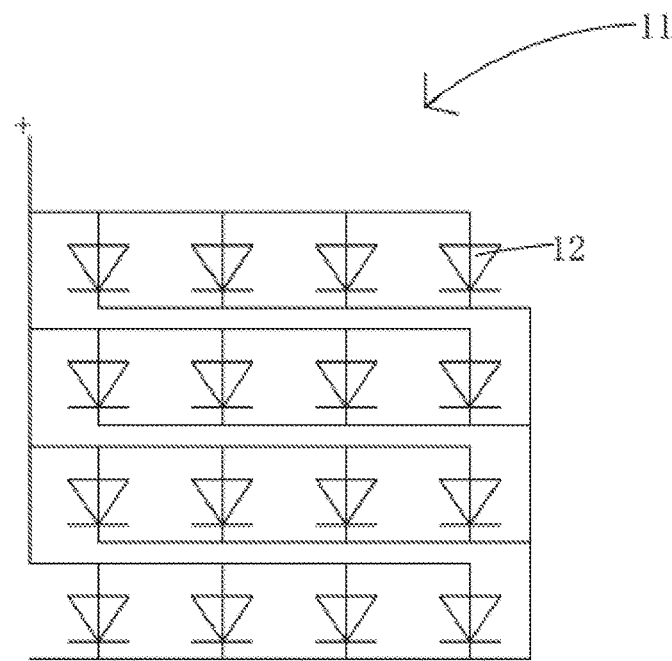
FIG. 4 is a schematic view of a light-emitting block in a light source panel of a backlight module according to an embodiment of the present disclosure.

In details, referring to FIG. 4, the backlight 12 is a light emitting diode (LED) lamp. Preferably, each of the light-emitting blocks 11 includes sixteen backlights 12 arranged in four rows and four columns.

Further, as illustrated in FIG. 5, a soldering trace of each of the light-emitting blocks 11 of the backlight 12 includes a positive electrode soldering trace 31 and a negative electrode soldering trace 32. The positive electrode soldering trace 31 is connected to a positive electrode of each of the backlights 12, the negative electrode soldering trace 32 is connected to a negative electrode of each of the backlights 12, thereby realizing the backlights 12 in a same light-emitting block 11 to be connected in parallel.

An embodiment of the present disclosure also provides a display device including the above backlight module.

In summary, the embodiment of the present disclosure provides a backlight module including a light source panel, a first optical control layer, and a second optical control layer. The light source panel includes a plurality of light-emitting blocks arranged in an array, and each of the light-emitting blocks is provided with a plurality of backlights arranged in an array and connected in parallel. The first optical control layer is spaced apart from the light source panel. The first optical control layer includes a plurality of control regions, each of the control regions corresponds to one of the backlights, and each of the control regions has a light transmittance increasing from a center position of each of the control regions to an edge position of each of the control regions. The second optical control layer surrounds each of the light-emitting blocks and is configured to collect light emitted by each of the light-emitting blocks, such that the light emitted by each of the light-emitting blocks is emitted to a corresponding control region. Each of the control regions is controlled, such that the light emitted by the backlight module is evenly distributed, a light emitting performance of the backlight module is improved, and a structure thereof is simple, which is beneficial to thinning of the backlight module. The embodiment of the present disclosure also provides a display device capable of improving a uniformity of light distribution and improving a display performance.

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

What is claimed is:

1. A backlight module, comprising:
a light source panel comprising a plurality of light-emitting blocks arranged in an array, and each of the light-emitting blocks provided with a plurality of backlights arranged in an array and connected in parallel;
a first optical control layer spaced apart from the light source panel, wherein the first optical control layer comprises a plurality of control regions, each of the control regions corresponds to one of the backlights, and each of the control regions has a light transmittance increasing from a center position of each of the control regions to an edge position of each of the control regions; and
a second optical control layer surrounding each of the light-emitting blocks, wherein the second optical control layer is configured to collect light emitted by each of the light-emitting blocks, such that the light emitted by each of the light-emitting blocks is emitted to a corresponding control region to avoid crosstalk of the light from different light-emitting blocks;
wherein each of the control regions is provided with a plurality of light-transmitting holes spaced apart from each other, in a same control region, a density of the light-transmitting holes gradually increases from the center position of each of the control regions to the edge position of each of the control regions, and the central position of each of the control regions has no light-transmitting holes.

2. The backlight module according to claim 1, wherein the first optical control layer is a haze film.

3. The backlight module according to claim 2, wherein each of the light-transmitting holes has a circular shape.

4. The backlight module according to claim 2, wherein the first optical control layer has a haze greater than 90%.

5. The backlight module according to claim 1, wherein the second optical control layer is one or a combination of a grating layer and a light angle modulator.

6. The backlight module according to claim 1, wherein the backlight is a light emitting diode (LED) lamp.

7. The backlight module according to claim 1, further comprising a diffusion film disposed on a side of the first optical control layer away from the light source panel.

8. The backlight module according to claim 1, wherein each of the light-emitting blocks comprises sixteen backlights arranged in four rows and four columns.

9. The backlight module according to claim 1, wherein the center position of each of the control regions is directly above a corresponding backlight.

10. A display device comprising a backlight module, the backlight module comprising:
a light source panel comprising a plurality of light-emitting blocks arranged in an array, and each of the light-emitting blocks provided with a plurality of backlights arranged in an array and connected in parallel;
a first optical control layer spaced apart from the light source panel, wherein the first optical control layer comprises a plurality of control regions, each of the control regions corresponds to one of the backlights, and each of the control regions has a light transmittance increasing from a center position of each of the control regions to an edge position of each of the control regions; and
a second optical control layer surrounding each of the light-emitting blocks, wherein the second optical control layer is configured to collect light emitted by each of the light-emitting blocks, such that the light emitted by each of the light-emitting blocks is emitted to a corresponding control region to avoid crosstalk of the light from different light-emitting blocks;
wherein each of the control regions is provided with a plurality of light-transmitting holes spaced apart from each other, in a same control region, a density of the light-transmitting holes gradually increases from the center position of each of the control regions to the edge position of each of the control regions, and the central position of each of the control regions has no light-transmitting holes.

11. The display device according to claim 10, wherein the first optical control layer is a haze film.

12. The display device according to claim 11, wherein each of the light-transmitting holes has a circular shape.

13. The display device according to claim 11, wherein the first optical control layer has a haze greater than 90%.

14. The display device according to claim 10, wherein the second optical control layer is one or a combination of a grating layer and a light angle modulator.

15. The display device according to claim 10, wherein the backlight is a light emitting diode (LED) lamp.

16. The display device according to claim 10, further comprising a diffusion film disposed on a side of the first optical control layer away from the light source panel.

17. The display device according to claim 10, wherein each of the light-emitting blocks comprises sixteen backlights arranged in four rows and four columns.

18. The display device according to claim 10, wherein the center position of each of the control regions is directly above a corresponding backlight.

* * * * *